Fig:1.

Dec. 18, 1945.   F. T. POWERS   2,391,191
X-RAY CASSETTE
Filed Nov. 24, 1942   3 Sheets-Sheet 2

INVENTOR
Frank T. Powers
BY
Hobart N. Durham
ATTORNEY

Dec. 18, 1945.                 F. T. POWERS                 2,391,191
                              X-RAY CASSETTE
              Filed Nov. 24, 1942              3 Sheets-Sheet 3
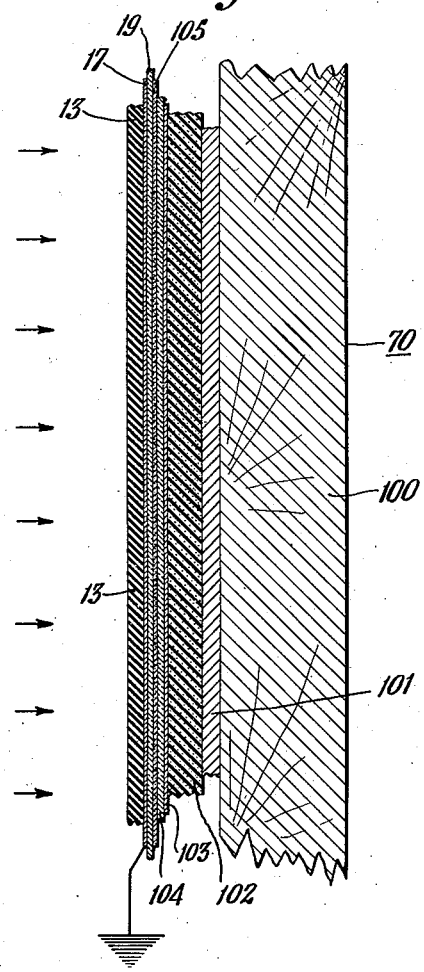
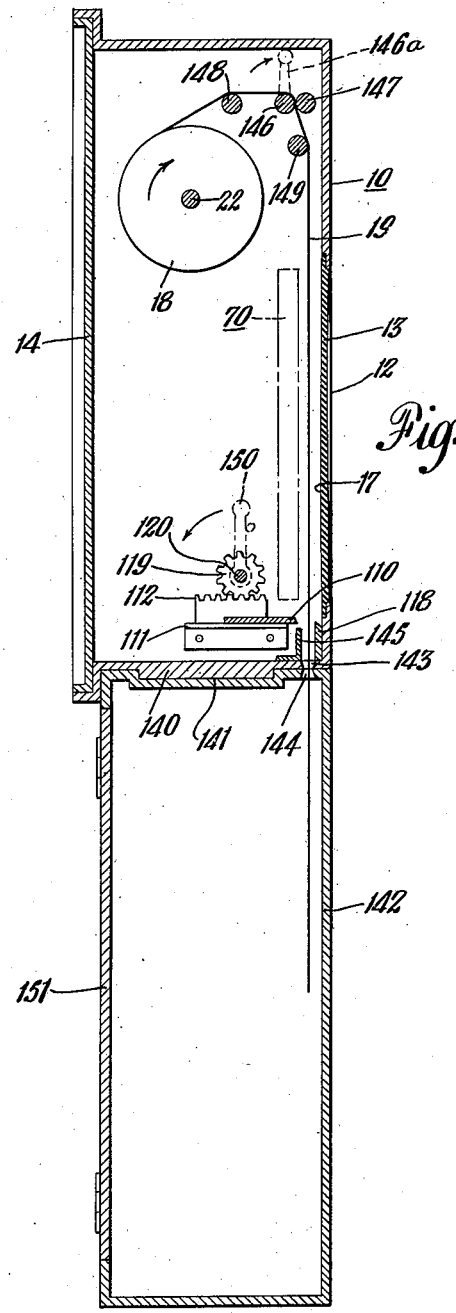

Patented Dec. 18, 1945

2,391,191

UNITED STATES PATENT OFFICE 2,391,191

X-RAY CASSETTE

Frank T. Powers, Glen Cove, N. Y.

Application November 24, 1942, Serial No. 466,737

10 Claims. (Cl. 250—66)

This invention relates to the radiographic art and relates more particularly to certain new and useful improvements in holders, that is, cassettes, for holding the ray sensitive medium in position during exposure to the sensitizing rays.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 3 is an enlarged view in vertical section of details of the film clamping mechanism; and, Fig. 4 is a vertical section showing another embodiment of the present invention.

Figure 1:
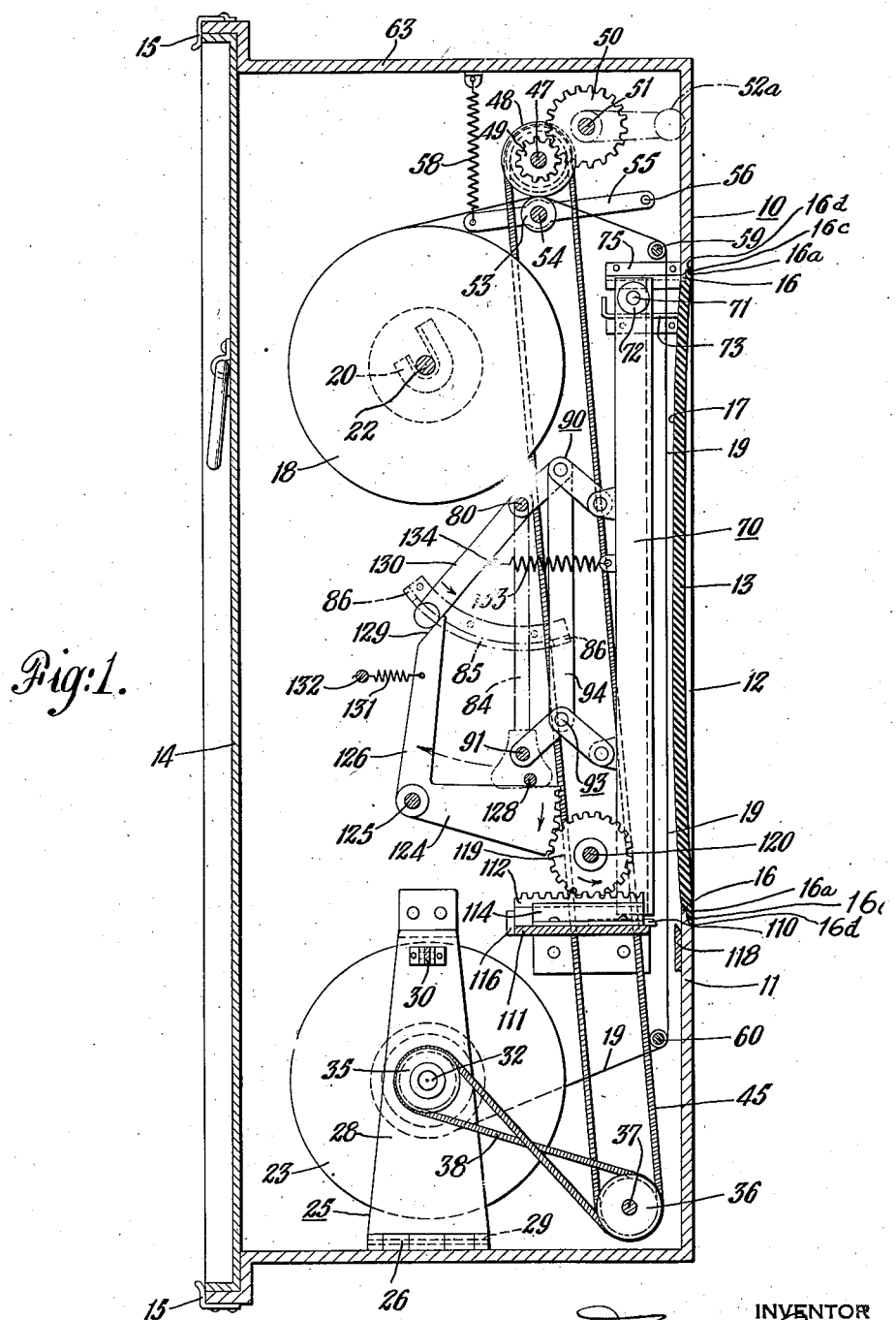
Fig. 1 is a vertical section taken along the line 1—1 of Fig. 2 showing a typical and illustrative X-ray cassette embodying the present invention.

It is one of the objects of this invention to provide a new and improved cassette for X-ray radiography; and, to provide a cassette, for use with a strip of ray-sensitive material, which will make possible the processing of an exposed portion of the strip at any time without sacrifice of the unexposed portions of the strip.

Other and further objects of this invention are: to provide a cassette, for use with a strip of ray-sensitive material, which will hold the ray-sensitive material in a more nearly true plane during exposure and will effect a more uniform contact between the ray-sensitive material and an intensifying screen, than has heretofore been obtainable; which will prevent static electricity such as is frequently generated by unreeling of the strip in the cassette from harmfully affecting the ray-sensitive material; and which will permit an operator to sever an exposed portion of the strip at any time and to remove and process the severed portion, or portions, of the strip at any convenient time without interference with continued uninterrupted use of the cassette in the radiographic operation in which it is being employed.

In accordance with the invention, there is provided a casing which is opaque to light and is also opaque to X-radiation except over a given area which forms a window through which a measured length of a long strip of ray-sensitive material may be exposed to X-radiation. Means are provided for feeding measured lengths of the strip of ray-sensitive material past said exposure window. Means actuable from without the casing are provided for clamping a measured length of the film strip within the exposure area so that it will be held therein in intimate contact with an intensifying screen and in a substantially true plane normal to the primary axis of the X-ray beam during the exposure period. For convenience in expression, the ray-sensitive material is sometimes hereinafter referred to as film although it is to be understood that the term film is not used in a restrictive sense, but is intended to include paper base ray-sensitive material as well as the usual cellulose base ray-sensitive material.

The film feeding means is actuable from the exterior of the casing to unreel measured lengths of the film strip from a fresh film magazine within the casing; to move each measured length of film into the exposure area so that it may be exposed to X-radiation; and, to deliver the exposed length of film to a used film magazine. The film clamping means is actuable from the exterior of the casing and includes a clamping unit, movable into and out of a predetermined clamping position. The clamping unit is suitably supported within the casing for linear back and forth movement parallel to the axis of the activating beam, the clamping face of the unit being constituted by an intensifying screen of planar contour. Uniform contact of each length of film with the intensifying screen, and holding of each said length in a substantially true plane normal to the beam axis during exposure, is obtained by providing the casing, within the exposure area, with an inwardly concaved flexible wall portion of cylindrical contour in opposition to the clamping unit. Thus, as each length of film strip is clamped between the movable clamping unit and the flexible wall portion, the latter, by reason of its cylindrical contour, will be gradually flattened out until it is in substantial parallelism and intimate contact with the intensifying screen and the length of film is firmly held in a true plane normal to the X-ray beam axis.

The operation of unreeling the film strip from the fresh film magazine and feeding it past said exposure area creates static electricity which, if allowed to accumulate on the film strip, may discharge with harmful effect to the film emulsion. So called "hen tracks" in a film negative are a typical manifestation of these electrical effects. Means are, therefore, provided for dissipating any electrical charge acquired by the film strip from any cause, whether frictional or atmospheric. To this end the film contacting face of the flexible wall portion is faced with electrically conductive material which is suitably electrically grounded through the casing. The nature of the facing material is preferably such that X-rays in transit therethrough will be filtered so as to improve the quality of the rays which reach the film and, a priori, the sharpness of the radiographic image which they produce.

It will be apparent that as clamping of a length of the film strip is initiated the clamping pressure would tend to be somewhat localized on the intensifying screen in consequence of the curved contour of the flexible wall portion. In order to distribute this pressure over the entire area; to keep the pressure below a value which might injure the screen or film; and, to accommodate the screen to any inequalities in the film surface or the surface of the flexible wall portion, the intensifying screen is flexibly mounted in its unit upon a layer of compressible resilient material, for example, sponge rubber. Discoloration of the intensifying screen by chemical action between the screen and the rubber is prevented by physically insulating the screen from the rubber by means of a thin sheet of aluminum or other suitable protective material.

In order to make possible the processing of an exposed portion of the film strip without the necessity of removing the entire film strip from the cassette, or of standing by until the unexposed portion of the strip has been exposed in normal course, or of wasting the unexposed portion, means are provided for severing the exposed portions of the film strip therefrom at will. The film severing means is actuable from the exterior of the cassette, the requisite actuating mechanism being preferably coupled with that of the clamping unit so that the operations of severing and clamping may be carried out in consequence of movements of a single actuating mechanism in opposite directions.

As each measured length of the film strip is moved out of the exposure position it is delivered to a suitable used film magazine adapted to receive and contain the exposed portion of the film strip. However, if at any time processing of the exposed portion becomes desirable, the exposed portion may be severed from the strip, thus permitting the magazine containing the exposed portion to be removed and replaced so that the radiography may continue uninterruptedly while processing of the exposed portion is carried out.

It will be understood that the foregoing general description and the following detailed description as well are exemplary and explanatory of the invention but are not restrictive thereof.

Figure 2:
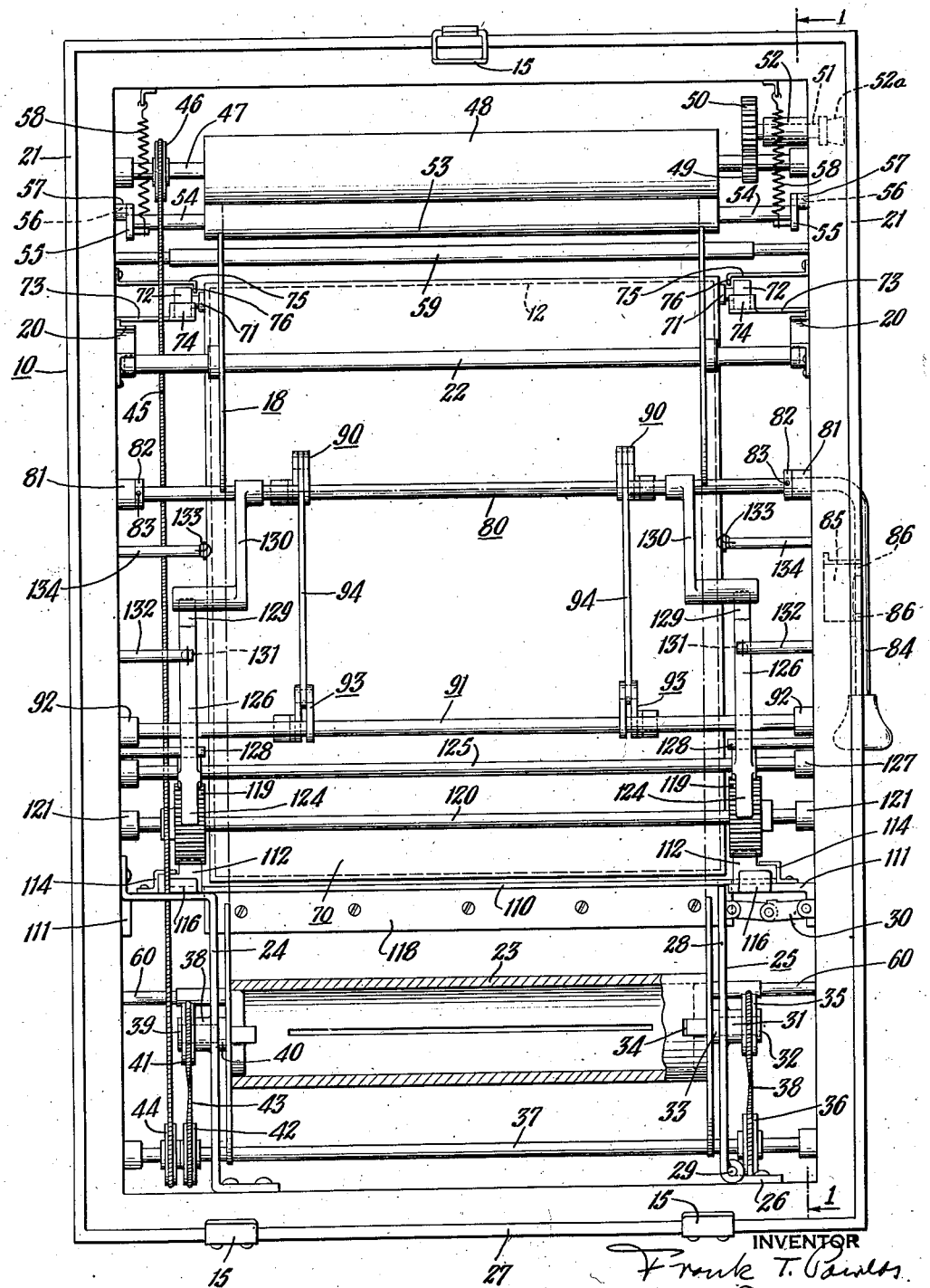
Fig. 2 is a rear elevation of the embodiment shown in Fig. 1 with the back of the cassette removed, the film strip being indicated in the showing in diagrammatic fashion.

Referring now more particularly to the illustrative embodiment of the invention as shown in Figures 1 to 3 inclusive, a casing 10 has a planar front wall 11 apertured to provide an opening 12 of rectangular contour forming an exposure area occupied by a window member 13 of material which is opaque to light but permeable to X-rays, such, for example, as aluminum, Bakelite or other synthetic resin. The casing 10 is formed of material, such as aluminum or wood which provide a light weight structure of satisfactory structural rigidity and strength. Entry of X-rays, except through the window member 13, is prevented by the provision of a layer of sheet lead (not shown) lining the cassette walls. The thickness will be governed by the type of service for which the cassette is to be used. Lead sheets of a thickness in the order of from $\tfrac{1}{16}''$ to $3\tfrac{3}{32}''$ are suitable for moderate ray intensities.

Access to the interior of the casing 10 is made possible through the provision of a removable rear wall 14. Fastening devices, such as the latch members 15 serve to lock and retain the wall 14 in position. The edges of the front wall opening 12 and its window member 13 are each recessed so as to provide light-sealing flanges 16 and 16a, respectively which lie in overlapping relation. The window flanges 16a respectively terminate in a bevelled surface 16c which is normally in slightly spaced relation to a complementary bevelled surface 16d of the front wall 11 thereby to permit relative angular movement of the window member and front wall as flexing of the window member is carried out.

The window member 13 is of cylindrical contour and is positioned in the opening 12 with its linear surface elements horizontal and its concaved periphery facing outward. Thus, it will be seen that if pressure is applied to, and centrally of, the inner convex surface of the window member, the latter will tend to flatten out and become co-planar with the front wall 11 of the casing. At the same time the window member tends to become longer in the direction of curvature and hence is pressed into firmer contact with the wall 11 along its upper and lower edge portions so as to prevent dislodgment of the window member from the opening 12. If necessary, a retaining strip (not shown) may be secured to the wall 11 in overlapping relation to the flanges 16a of the window member.

Means are provided for dissipating static electrical charges which tend to build up on the film strip in consequence of the movement of the film strip within the casing. As here embodied, the inner face of the window member 13 is covered with a charge dissipating member 17 of electrically conductive material, such as a thin sheet of aluminum, which is cemented thereto and is grounded in any suitable fashion, as is diagrammatically shown in Figure 3, to the casing 10. As will appear more fully hereinafter, the charge dissipating member 17 forms the film contacting face of the window member 13. Hence, such electrical charge as is accumulated by the film will be transferred thereto before it has had opportunity to build up to a value at which it could discharge to a lower potential surface and thereby injuriously affect the film. It will be understood that the casing 10 is in turn electrically grounded, it being customary in the art to ground the frames of all high tension X-ray units, or units operated in conjunction therewith. Thus, the flexible feed cable to the high tension X-ray unit (not shown) is customarily provided with a third wire by means of which the X-ray unit is grounded back at the switchboard or panel box from which power is taken to operate the X-ray unit. This third wire is the ground wire and is connected to the frame, usually metal, of the unit. Such grounding is diagrammatically represented in Fig. 3 and enables the dissipation of electrical charges which would otherwise accumulate on the film. In addition to its charge dissipating function, the member 17 performs a further function in that it serves as a filter for the radiation which must pass therethrough to the ray-sensitive material within the casing. The thickness of the material of which the member 17 is constituted is therefore chosen with this object in view and may be varied within relatively wide limits depending upon the filtering characteristics of the metal employed. In general, sheet aluminum of a thickness in the order of .01" will be found to have the necessary ray filtering and charge dissipating characteristics.

A fresh film magazine in the form of a spool 18 upon which is wound a strip of film 19 is carried in hangers 20 each hanger being fixed to one of the side walls 21 of the casing in the upper portion thereof. The hangers 20 are U-shaped so as to provide rearwardly inclined open bearings in which an axle shaft 22 of the film magazine 18 is journalled at either end and from which the magazine may be removed at will.

A used film magazine in the form of a spool 23 supported in brackets 24 and 25 at either end thereof is located in the lower portion of the casing 10.

The spool 23 is removably mounted in the brackets 24 and 25 and to this end the bracket 25 is formed as a hinge of which one leaf 26 is fixed to the bottom wall 27 of the casing 10. The other leaf 28 is adapted to be swung in a limited arc toward and away from the spool 23 about the hinge pivot 29 and to this end its upper extremity is flexibly connected to the side wall 21 by a toggle 30.

The toggle 30 is suitably dimensioned so that with the hinge leaf 28 in a substantially vertical position, the lever arms will be slightly out of axial alignment and will be in a downwardly diverging relation. In consequence, an upward pressure applied manually to the toggle joint will cause the hinge leaf 28 to move toward the adjacent wall of the casing thereby to release the spool so that it may be removed. The hinge leaf 28 is provided intermediate its ends with a bearing hub 31 in which a shaft 32 is journalled and is adapted to rotate the spool 23.

The shaft 32 is formed at its inner end with a key member 33 which is normally received and removably lodged in a complementary keyway 34 in the adjacent end of the spool 23. The opposite end of the shaft 32 carries a sheave 35 adapted to be driven in either direction by a sheave 36 carried on a shaft 37, the sheaves 35 and 36 being mechanically coupled by a crossed spring belt 38. A substantially similar driving mechanism is provided at the opposite end of the spool 23. Thus, the bracket 24 which is suitably secured at either end to the bottom wall 27 and a side wall 21 of the casing, is provided with the bearing hub 38 in which is journalled a shaft 39 having the key member 40 and sheave 41 at its inner and outer extremities, respectively, the sheave 41 being adapted to be driven by a sheave 42 on shaft 37, the sheaves 41 and 42 being mechanically coupled by a crossed spring belt 43.

The shaft 37 is journalled at either end in the side walls 21 and is adapted to be manually driven from outside of the casing by suitable mechanism for the purpose provided. To this end, the shaft carries a sheave 44 which is coupled by a spring belt 45 to a sheave 46 carried by a shaft 47 situated in the upper portion of the casing and journalled at either end in the side walls of the casing.

The shaft 47 carries a friction feed roller 48 concentric therewith and somewhat wider than the width of the film strip.

A gear 49 on the shaft 47 is engaged by a gear 50 secured to the inboard end of a shaft 51 which latter is journalled in a sleeve bearing 52 fixed to the side wall 21.

The shaft 51 extends through the sleeve bearing 52 and side wall and is provided at its outer extremity with a crank 52a by which it may be rotated at will so as to drive film feed roller 48 and take-up spool, or reel, 23.

An idler friction feed roller 53 is journalled on a shaft 54 which in turn is secured at its ends to a pair of rearwardly extending angularly adjustable lever arms 55. Each arm 55 is secured at its forward extremity to one of a pair of shafts 56 each journalled in one of a pair of bearing members 57 carried by the side walls 21.

Each arm 55 is normally urged upwardly by one of a pair of coil springs 58 so as to cause the roller 53 to press film strip 19 between it and friction roller 48. Each spring is attached at one end to the rear extremity of one of the arms 55 and is attached at its other end to the top wall of the casing.

This film strip 19 is threaded from the spool 18 between the upper and lower film feed rollers 48 and 53, respectively, and runs downwardly over the vertically aligned upper and lower guide rollers 59 and 60, respectively, back of the window member 13 and is secured at its leading edge to the take-up spool 23.

Thus it will be seen that as the film crank 52a is rotated in a clockwise direction, as viewed in Figure 1, the film strip will be drawn from the spool 18 by the film feed rollers 48 and 53 and will travel through the exposure position behind the exposure window member 13 onto the take-up spool 23. At the same time the rotation of the shaft 47 will be transmitted via the sheave 46, belt 45 and sheave 44 to the shaft 37 which in turn drives the take-up spool 23 at a controlled rate through the belts 38 and 43 and sheaves 35, 36, 41 and 42 so as to hold the film strip taut between the guide rollers 59 and 60. It is, therefore, apparent that the film feeding mechanism provides a positive means for feeding measured lengths of the film strip through the exposure position so that the successive measured lengths may be individually and successively exposed through the window member 13 for the making of radiographs in rapid sequence. It will be understood that the tendency of the take-up roll 23 to pull the film off the spool 18 at a faster rate than that at which the friction rollers pull the film, is overcome by permitting belt 45 to slip on sheaves 44 and 46. In consequence, the film will be held taut between guide rollers 59 and 60.

Means are provided for clamping each measured length of the film strip within the exposure area so that it will be held therein during exposure in a substantially true plane normal to the primary axis of the X-ray beam and in intimate contact with the intensifying screen. As here embodied, a clamping unit 70, whose film clamping face is dimensioned to cover the opening 12 and/or window member 13, is suspended at its top on suitable anti-friction bearings for movement normal to the wall 11 toward and away from the window member 13 within the enclosure member.

The clamping unit 70 is provided adjacent its upper edge with a pair of coaxial shafts 71 each of which extends from one side of the unit toward the adjacent side wall of the casing.

Each shaft 71 is equipped at its outer extremity with a roller 72, which rests upon and is adapted to roll back and forth upon a platform formed by one of a pair of rails 73.

Each rail 73 is secured in any suitable fashion to the adjacent side wall 21 and terminates at its rear extremity in an upstanding flange 74, which serves to limit the extent of linear rearward travel of the rollers 72 and, hence of the clamping unit 70, in the casing. Lateral movement of the clamping unit is prevented by a pair of arms 75 each of which extends inwardly from one of the casing side walls 21 to which it is secured in any suitable fashion, the inner extremity of each arm terminating in a depending flange 76 interposed between one of the rollers 72 and the clamping unit 70. Thus, it will be seen that the clamping unit is capable of linear movement backwards and forward in the casing.

Means are provided for actuating the clamping unit so as to clamp the film strip 19 between the clamping unit and the flexible wall portion formed by the window member 13.

As here embodied, a shaft 80 extends between the side walls 21 parallel to and between the axes of the spools 18 and 23. Bearing members 81 on the opposite side walls of the casing support the shaft 80 for rotation therein, axial movement of the shaft in the bearings being prevented by thrust collars 82 which are removably attached to the shaft by set screws 83, or in any convenient fashion. The shaft 80 extends through one of the side walls and is preferably formed exteriorly of the casing as a crank 84 for rotating the shaft 80.

Means are provided for limiting the extent of angular movement of the crank arm 84. To this end an arcuate member 85 having an outstanding flange 86 at either end is suitably secured to a side wall of the casing externally thereof.

A pair of toggles 90 connect the shaft 80 to the clamping unit 70, a like arm of each toggle being fixedly secured to the shaft 80, the other arm of each being pivotally secured to the back of the clamping unit.

A shaft 91 is positioned vertically beneath the shaft 80 in parallel relation thereto, the shaft 91 being journalled at each end in one of a pair of bearings 92 each secured in any suitable fashion to one of the side walls 21.

A pair of toggles 93 connect the shaft 91 to the clamping unit 70, a like arm of each toggle member being fixedly secured to the shaft 91, the other arm of each being hingedly secured to the back of the clamping unit.

Each pair of the toggles 90 and 93 is coupled together at the respective hinge fulcrums by one of a pair of links 94. Thus, a given angular movement of the toggles 90 will be followed by an equal angular movement of the toggles 93.

The toggles 90 and 93 and the links 94 are so proportioned and arranged that with the clamping unit fully disengaged, and the crank arm 84 in the neutral position as in Fig. 1, the arms of each toggle will lie in downwardly diverging relation to each other so that a clockwise movement of the crank arm, as viewed in Fig. 1, will expand the toggles equal amounts and move the clamping unit toward the window member 13. Movement of the crank arm 84 its full clockwise extent as determined by the stop member 86 should fully extend the toggles and effect the desired clamping action.

The clamping unit 70 comprises, as is best shown in Figure 3, a backing plate 100 of plywood or other suitable lightweight material capable of preserving its shape during extended use, the front face of this plate being larger than the window member 13 and being covered with a shield member 101 preferably a layer of sheet lead of approximately $\frac{1}{16}$" thickness so as to prevent X-rays which have penetrated the film from scattering around within the casing 10 or reaching either the fresh film or used film magazines.

A flexible mounting member 102 of resilient material, preferably sponge rubber in sheet form of approximately ¾" to 1" thickness, is cemented to the shield member 101, the front face of the member 102 being cemented in turn to an insulating member 103 of metal, preferably aluminum in sheet form of approximately .002" thickness, serving to insulate the member 102 from an intensifying screen 104. The insulating member 103 prevents possible chemical action which would injure the intensifying screen, particularly if rubber is the material of which mounting member 102 is formed. The screen 104 is preferably attached only at its corners or edges to the insulating member 103 so as to avoid staining the screen with cement. The metal insulating member 103 is preferably electrically grounded through the casing 10 after the manner of the charge dissipating member 17.

Means are provided for severing from the film strip when unclamped a portion thereof which has passed through the exposure position. As here embodied, a knife blade 110 is reciprocably slidably mounted, for linear forward and backward movement within and horizontally of the casing 10, upon a knife table formed by a pair of brackets 111 suitably secured to the side walls 21.

The knife blade 110 is suitably secured at each end as by welding, bolting or in any other convenient fashion, to one of a pair of identical rack members 112, each slidably mounted on one of the brackets 111, beneath one of a pair of guide members 114. Suitable means for limiting the extent of rearward movement of the rack members and hence of the knife blade are provided in the form of a pair of upstanding lugs 116 one of which is provided on each of the brackets 111.

The knife blade 110 is of sufficient length to permit it to sever any film strip employed in the cassette and it is located subjacent the bottom of the clamping unit 70 so as to permit severing the film strip just below the bottom edge of the window member 13. To this end, a knife blade 118 is fastened to the front wall 11 of the casing with its cutting edge horizontally disposed and parallel to the cutting edge of the knife blade 110.

The cutting edges of the knife blades 110 and 118 are suitably beveled, positioned and arranged so that as the blade 110 slides across the blade 118, the film strip will be horizontally severed.

Means are provided for reciprocating the knife blade 110 from the exterior of the cassette. As here embodied, a pair of pinion gears 119 is fixed to a shaft 120 so that each gear engages one of the rack members 112, the shaft 120 being journalled at each end in one of a pair of suitable bearing members 121 each secured in any suitable fashion to one of the side walls 21.

The gears 119 are adapted to be rotated together by means of a pair of toothed sector members 124 each secured to a shaft 125 and having a lever arm 126. The shaft 125 is journalled at each end in one of a pair of bearing members 127 each suitably secured to one of the side walls 21.

A pair of limit members 128 extends inwardly from the respective side walls 21 in coaxial alignment and act to limit the movement of the sector members 124 in one direction and thereby limit the extent of rearward travel of the knife blade 110.

Each of the sector arms 126 terminates in a bevelled surface portion 129 to be engaged by one of a pair of lever arms 130 secured to the shaft 80. Thus, by effecting counterclockwise movement of the crank arm 84, from the neutral position, as viewed in Fig. 1, the lever arms 130 will be caused to press upon the sector arms 126 and rotate the sectors 124.

This clockwise movement of the sector members is transmitted through the pinion gears 119 to the rack members 112 thereby moving the knife blade 110 forwardly to sever the film strip.

Thus it will be observed that as viewed in Fig. 1, the movement of the crank arm 84 to sever the film strip is opposite in direction to that which moves the clamping unit 70 forwardly into clamping engagement with the film strip from the neutral position shown in Fig. 1. Further, it is to be observed that the lever arms 130 are so arranged angularly that they do not contact the sector lever arms 126 until the clamping unit 70 has moved a substantial distance rearwardly wholly out of clamping engagement with the film strip.

Means are provided for automatically restoring the knife blade 110 to its starting position as the crank arm 84 is restored to its starting position. As here embodied, each of a pair of springs 131 connects one of the sector lever arms 126 to one of a pair of lugs 132, the tension of the springs providing the necessary restoring force for returning the lever arms, and hence the knife blade, to the starting position as the crank 84 is released.

Similarly, each of a pair of coil springs 133 connects the clamping unit 70 to one of a pair of lugs 134, the springs functioning to oppose yieldably movement of the clamping unit from its neutral (disengaged) to its clamping position. Consequentially, they assist in restoring the clamping unit to its neutral position.

In operating the cassette shown in Figs. 1 to 3, the cassette is loaded in a dark room with a roll of fresh film, the film spool 18 on which the strip of film is wound being placed in the spool hangars 20 to which access is had by removing the back wall 14 of the casing.

The film strip is threaded between the film feed rolls 48 and 53, over guide roller 59, downwardly between clamping unit 70 and window member 13, around guide roller 60 and attached to the spool 23 preferably by insertion in a slot or fastener customarily provided therein for that purpose. It is essential that the sensitized surface of the film strip, as represented by the emulsion layer 105 in Fig. 3, face the clamping unit so that it will be in contact with the intensifying screen 104 thereof when clamped.

The back wall 14 is now replaced and the crank 52a rotated until an unexposed portion of the film strip has been positioned in front of the window member 13. Obviously, suitable indicating devices (not shown) may be actuated by the film feeding mechanism so as to permit the operator to determine precisely what length of the film strip has been moved through the exposure position.

Clamping of the film in the exposure position is now effected by moving the crank arm 84 clockwise, as viewed in Figure 1, to its full extent as determined by the stop member 86. By this operation, the clamping unit 70 is caused to move toward the front wall 11, first contacting the film strip 19 and pressing the film against the metal charge dissipating plate 17 forming the inner convex face of the window member 13. Whatever static charge may have accumulated on the film during the unreeling operation preparatory to clamping is transferred through the plate 17 to the walls of the cassette from whence it will be dissipated through a suitable ground as has been hereinbefore described. Film injury due to the accumulation on and discharge of static electricity through the film is thus obviated and the formation of "hen tracks" and other objectionable markings consequent upon electrical discharges is wholly avoided.

It will be observed that the curvature of the window member 13 results in a progressive clamping of the film between the clamping unit and window member over an area gradually increasing in magnitude in both directions from the middle line of the window member toward the top and bottom edges thereof. As the clamping pressure is increased, the window member 13 becomes more and more planar in contour until the clamping unit 70 is locked in its full forward position. At that time the portion of the film strip in the exposure position will be firmly held over the whole area thereof in a plane substantially normal to the axis of the primary X-ray beam entering the opening 12. Thus, uniform sharpness may be obtained over the whole film area in the exposure position.

The resilient member 102 serves to distribute the clamping pressure over a wider area during the clamping operation and to obtain a more uniform distribution of the clamping pressure during exposure thereby avoiding localized pressures of high intensities injurious to both the film and to the relatively fragile intensifying screen 104 in contact therewith.

During exposure, the metal plate 17 filters the rays passing therethrough thereby enhancing their quality and the sharpness of the radiographic image as will be obvious to those skilled in the art.

The exposure having been completed, the crank arm 84 is moved in a counterclockwise direction, as viewed in Fig. 1, back to its starting position thereby releasing the film strip as the clamping unit 70 is retracted therefrom.

The film feed crank 52a is now rotated sufficiently to position a fresh unexposed portion of the film strip in the exposure position. By the same operation, the exposed portion is moved out of the exposure position and ordinarily would be wound onto the film spool 23. Alternatively, however, the exposed portion of film may be severed from the strip at this time if it be so desired. To accomplish this, the crank arm 84 is given a further counter clockwise movement as viewed in Fig. 1 thereby causing the knife blade 110 to move forwardly and sever the film strip in coaction with the knife blade 118.

The spool 23 carrying the severed portion may be removed in a dark room and an empty spool substituted therefor. Substitution of a take-up spool is readily accomplished by "breaking" the toggle member 30 sufficiently to withdraw the spool winding key 30 from the spool slot 34 and then substituting spools. In such case the film strip must be reattached to the take-up spool before use.

Referring now more particularly to the embodiment of this invention shown in Fig. 4, the used film magazine is located externally of the casing and forms a detachable receptacle into which the exposed film is adapted to be deposited.

As here embodied, the bottom wall of the casing 11 is provided with a tongue 140 which is seated in a groove 141 in the top of a receptacle 142 detachably connected by suitable means (not shown) to the casing 11.

Registering slits 143 and 144 in the casing 10 and receptacle 142, respectively, are designed to permit transfer of the film strip from the casing 10 into the receptacle, the slit in the casing being located preferably slightly rearwardly of the front wall thereof so as to be in substantial alignment with the film as it descends between the clamping unit 70 and window member 13. A guide member 145 adjacent the slit 143 facilitates the passage of film through the slit. The slits 143 and 144 may be lined with velvet so as to provide light-tight openings in the known manner.

The film feeding mechanism as here embodied comprises a pair of film feed rolls 146 and 147 actuatable from the exterior of the casing 11 by a crank 146a which may be attached to the shaft of feed roll 146. The rolls 146 and 147 function to unreel the film strip 19 from the spool 18, the film being threaded over a pair of guide rolls 148 and 149 so as to descend between the clamping unit 70 and window member 13, the former being diagrammatically indicated for the sake of simplicity, but being in all respects equivalent in construction and function to the clamping unit 70 as described in connection with Figs. 1, 2 and 3.

Similarly, the film severing mechanism is depicted in a simplified showing, the pinion 119 being shown as rotatable by means of a crank 150 which engages the pinion shaft 120 exteriorly of the casing. The receptacle 142 is preferably provided with a hinged door 151 to permit access to its interior, the construction being such as to provide a light-tight structure. The receptacle is of source lined with lead to render it opaque to X-rays.

In operating the embodiment of Figure 4, the film feeding and clamping operations are carried out just as has been described with reference to the embodiment of Figures 1 to 3 inclusive. However, upon severance of the film strip, the severed portion is deposited in the receptacle 142 which may be detached for processing of the film at any convenient time, another receptacle being substituted therefor so that the making of the radiographs may proceed with a minimum of interruption. This construction possesses the obvious advantage that the casing 10 need not be removed and carried to the dark room in order that the severed portion of the film strip may be taken out for processing. In consequence, it lends itself to operations where time is at a premium.

It will be understood that for a permanent installation the front wall of the casing 10 and receptacle 142 may, if desired, form a part of a darkroom wall against which the X-ray beam is projected. In such case, the receptacle 142 need not be detachable, but may be permanently secured to or form a part of the casing 10 and the wall. Severed portions of the film strip may be deposited and contained in the receptacle pending their removal by the darkroom operator for processing.

The invention in its broader aspects is not limited to the specific mechanisms shown and described but departures may be made therefrom within the scope of the accompanying claims without departing from the principles of the invention and without sacrificing its chief advantages.

What I claim is:

1. A cassette for X-ray radiography with provision for handling and exposing successive portions of a long strip of ray sensitive material, the cassette comprising a casing having a curved flexible wall portion forming an X-ray permeable exposure window; clamping means within said casing movable into and out of a predetermined position for pressing a measured length of said strip into substantially planar engagement with said wall portion for exposure to X-rays through said window; and, means within said casing operable upon movement of said clamping means out of said predetermined position, for severing said strip.

2. A cassette for X-ray radiography with provision for handling and exposing successive portions of a long strip of ray-sensitive material, the cassette comprising a casing having an opening; a flexible member of substantially cylindrical contour forming an X-ray permeable exposure window in said opening; and, clamping means within said casing movable into and out of a predetermined position for pressing a measured length of said strip into substantially planar engagement with said member for exposure to X-rays through said window; and, means within said casing operable upon movement of said clamping means out of said predetermined position, for severing said strip.

3. A cassette for X-ray radiography with provision for handling and exposing successive portions of a long strip of ray-sensitive material, the cassette comprising a casing having a curved flexible wall portion faced with electrically conductive ray filtering material and forming an X-ray permeable exposure window therein; clamping means within said casing movable into and out of a predetermined position for pressing a measured length of said strip into substantially planar engagement with said wall portion for exposure to X-rays filtered through said window; and, means within said casing operable upon movement of said clamping means out of said predetermined position, for severing said strip.

4. A cassette for X-ray radiography with provision for handling and exposing successive portions of a long strip of ray-sensitive material, the cassette comprising a casing having a curved flexible wall portion forming an X-ray permeable exposure window therein; film spools within the casing; means including a handle externally of said casing for winding measured lengths of said strip from one of said spools past said window onto the other of said spools; clamping means within said casing including an intensifying screen movable into and out of a predetermined position for pressing a measured length of said strip into substantially planar engagement with said wall portion for exposure to X-rays through said exposure window; means within said casing operable upon movement of said clamping means out of said predetermined position, for severing said strip; and, means for selectively operating said clamping means and said severing means including a member externally of said casing.

5. A cassette for X-ray radiography with provision for handling and exposing successive portions of a long strip of ray-sensitive material, the cassette comprising a casing having a wall portion forming an X-ray permeable exposure window therein; means forming a used film magazine removably associated with said casing; a film spool within said casing upon which said strip is wound; means actuable from the exterior of said casing for transferring measured lengths of said strip from said spool past said window to said magazine means; clamping means within said casing movable into and out of a predetermined position for pressing a measured length of said strip into substantially planar engagement with said wall portion for exposure to X-rays through said window; and, means actuable from the exterior of said casing and operable upon movement of said clamping means out of said predetermined position, for severing said strip.

6. A cassette for X-ray radiography with provision for handling and exposing successive portions of a long strip of ray-sensitive material, the cassette comprising a casing having a wall portion forming an X-ray permeable exposure window therein; a receptacle forming a used film magazine detachably connected to said casing; a spool within said casing upon which said strip is wound; means for winding measured lengths of said strip from off said spool past said window into said receptacle; clamping means within said casing movable into and out of a predetermined position for pressing said strip into substantially planar engagement with said wall portion for exposure to X-rays through said window; and, means within said casing operable upon movement of said clamping means out of said predetermined position, for severing said strip.

7. A cassette for X-ray radiography with provision for handling and exposing successive lengths of a long strip of ray sensitive material, the cassette comprising a casing having an X-ray permeable exposure window therein; clamping means including an intensifying screen within said casing, said clamping means being movable into and out of a predetermined position for pressing a length of said strip against said window and into intimate contact with said screen for exposure to X-rays through said window; and, means within said casing operable upon movement of said clamping means out of said predetermined position, for severing said strip.

8. A cassette for X-ray radiography with provision for handling and exposing successive lengths of a long strip of ray sensitive material; the cassette comprising a casing having an X-ray permeable exposure window faced with electrically conductive ray filtering material; clamping means within said casing movable into and out of a predetermined position for pressing a length of said strip into engagement with said ray filtering material for exposure to X-rays filtered through said window and dissipation of electrical charges from said strip through said ray filtering material; and, means within said casing operable upon movement of said clamping means out of said predetermined position, for severing said strip.

9. A cassette for X-ray radiography with provision for handling and exposing successive portions of a long strip of ray-sensitive material, the cassette comprising a casing having an X-ray permeable exposure window therein; means forming a used film magazine removably associated with said casing; a film spool within said casing upon which said strip is wound; means actuable from the exterior of said casing for transferring measured lengths of said strip from said spool past said window to said magazine means; clamping means within said casing movable into and out of a predetermined position for pressing a measured length of said strip into intimate contact with said window for exposure to X-rays through said window; and, means actuable from the exterior of said casing and operable upon movement of said clamping means out of said predetermined position, for severing said strip.

10. A cassette for X-ray radiography with provision for handling and exposing successive lengths of a long strip of sensitized material, the cassette comprising a casing having an X-ray permeable window therein; winding reels within the casing; means for winding said strip off one reel and onto the other past said window for exposure to X-rays therethrough; means for clamping a length of said strip for exposure to X-rays through said window and means within said casing for severing a length of said strip after passage through the exposure position, from the remainder of said strip.

FRANK T. POWERS.